Aug. 16, 1927.
J. HERMAN
1,638,930
VOLTAGE REGULATOR FOR VACUUM TUBES
Filed Nov. 26, 1923
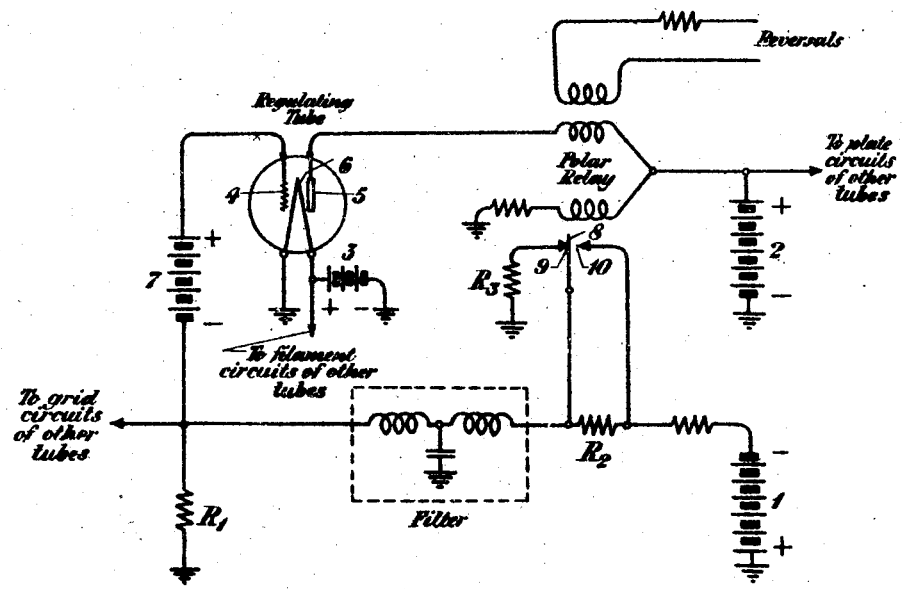
INVENTOR
J. Herman
BY
ATTORNEY Patented Aug. 16, 1927.

1,638,930

UNITED STATES PATENT OFFICE.

JOSEPH HERMAN, OF NEW YORK, N. Y., ASSIGNOR TO AMERICAN TELEPHONE AND TELEGRAPH COMPANY, A CORPORATION OF NEW YORK.

VOLTAGE REGULATOR FOR VACUUM TUBES.

Application filed November 26, 1923. Serial No. 677,156.

This invention relates to means for regulating the voltages of vacuum tubes, and more particularly to automatic means for regulating such voltages.

The principle object of the invention is to counteract the effects of voltage variations in the batteries supplied to the vacuum tubes.

As is well-known in the art, three common batteries may supply the voltages for the filament circuits, plate circuits, and grid circuits, respectively, of all vacuum tubes of a single system, for example, all those in any one office. The effects of variations in the common battery of the filament circuits are comparatively slight, and the problem of compensation for such variations is relatively unimportant. The effects of variations in the common batteries of the plate and grid circuits, however, are considerable, and it is to the solution of the problem of suitable compensation for voltage variations in these two batteries that applicant's invention is directed.

Applicant's arrangement includes, in association with the common batteries, a regulating vacuum tube, and means for increasing the voltage impressed upon the grid circuits of the tubes to be regulated, in response to an increase in the voltage of the common plate circuit battery, and vice versa, and for decreasing these voltages in response to a decrease in the common plate circuit battery or grid circuit battery, respectively.

The invention will be more clearly understood when the following detailed description of one desirable form of applicant's arrangement is read with reference to the accompanying drawing, which shows diagrammatically this form of circuit arrangement.

With reference to the details of the drawing, the battery 1 supplies the voltage for the grid circuits of a number of vacuum tubes. Only a portion of the voltage of this battery, namely the drop across the resistance $R_1$ is utilized for the purpose. The battery 2 supplies the voltage for the plate circuits of the tubes, and the battery 3 supplies the voltage for the filament circuits of the same.

The regulating apparatus consists of the regulating vacuum tube, with grid 4, plate 5, and filament 6; the polar relay, connected into the plate circuit of the regulating tube; and the resistances $R_2$ and $R_3$ in the circuit of the grid battery 1. The battery 7 opposes the voltage of the grid battery 1 in its effect upon the regulating tube, and is used merely to bring the operating point of the regulating tube to a sensitive part of its characteristic. The poling of the four batteries is indicated on the drawing.

The regulating tube is of the same type as the tubes to be regulated. Hence, it is obvious that the effect of voltage variation upon the regulating tube will be practically the same as the effect of such voltage variation upon the tubes to be regulated.

If all the battery voltages are of the proper values, the current in the plate circuit of the regulating tube is exactly equal to the biasing current in the polar relay winding, and these two currents neutralize each other as to effect upon the relay. Reversals (or an alternating current of fairly low frequency) are supplied to the relay through a third winding, which is wound upon the same core as the other two windings, and these reversals will, given the conditions named above, cause an unbiased vibration of the relay armature 8 between the contacts 9 and 10. The result is a current through resistance $R_1$ which will be of the proper value for the grid voltage required by the tubes.

The filter, indicated in the drawing, suppresses the alternating current component produced by the vibrating relay and prevents the application of this current to the grid circuits of the vacuum tubes. By reason of the presence of this filter, only the average value of the current produced in the circuit of the grid battery 1 is impressed across the resistance $R_1$.

If the voltage of the plate battery 2 increases, with a resultant increase in current in the regulating tube plate circuit, the relay will be biased to contact 10. Consequently, the resistances $R_2$ and $R_3$ are cut out of the circuit of battery 1 for a longer period than before, and the voltage drop across the resistance $R_1$ will be increased, and the grid voltage will be increased a sufficient amount to counteract the effect of the change in the plate battery 2. On the other hand, a decrease in the voltage of the plate battery 2 will bias the relay to contact 9 and connect the resistances $R_2$ and $R_3$ into the circuit of battery 1 with a resultant decrease of the current through resistance $R_1$, and, consequently, the grid voltage will be decreased.

Likewise, variations in the grid battery 1 will be compensated for by the causing of corresponding variations in the plate current of the regulating tube.

What is claimed is:

1. Means for automatically regulating the common grid voltage of vacuum tubes having a common source of plate voltage and a common source of grid voltage, comprising, in association with the common sources of voltages, a regulating vacuum tube and means controlled by said regulating tube for changing the common grid voltage in response to changes in the common plate voltage.

2. Means for regulating the common grid voltage of a plurality of vacuum tubes having a common source of plate voltage and a common source of grid voltage, comprising, in association with the common sources of voltages, a regulating vacuum tube and associated therewith means responsive to changes in the plate current of said regulating tube for automatically changing the common grid voltage.

3. Means for regulating the voltages of vacuum tubes having a common source of plate voltage and a common source of grid voltage, comprising, in association with the common sources of voltages, a regulating vacuum tube, a relay associated therewith, and circuit means associated with said relay whereby the common grid voltage is automatically increased or decreased in response to an increase or a decrease, respectively, of the common plate voltage.

4. Means for regulating the voltages of vacuum tubes having a common source of plate voltage and a common source of grid voltage, comprising, in association with the common sources of voltages, a regulating vacuum tube, a polar relay associated therewith, and circuit means associated with said relay whereby the common grid voltage is automatically increased or decreased in response to an increase or a decrease, respectively of the common plate voltage.

In testimony whereof, I have signed my name to this specification this 23rd day of November, 1923.

JOSEPH HERMAN.